United States Patent
Larson et al.

(10) Patent No.: US 10,747,679 B1
(45) Date of Patent: Aug. 18, 2020

(54) INDEXING A MEMORY REGION

(71) Applicant: Amazon Technologies, Inc., Seattle, WA (US)

(72) Inventors: Steven Scott Larson, Georgetown, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 15/838,284

(22) Filed: Dec. 11, 2017

(51) Int. Cl.
| G06F 12/10 | (2016.01) |
| G06F 12/1009 | (2016.01) |
| G06F 12/1027 | (2016.01) |
| G06F 9/455 | (2018.01) |
| G06F 13/16 | (2006.01) |
| G06F 12/1018 | (2016.01) |

(52) U.S. Cl.
CPC ...... *G06F 12/1009* (2013.01); *G06F 9/45558* (2013.01); *G06F 12/1027* (2013.01); *G06F 13/16* (2013.01); *G06F 12/10* (2013.01); *G06F 12/1018* (2013.01); *G06F 2212/7201* (2013.01)

(58) Field of Classification Search
CPC ........................................................ G06F 12/10
See application file for complete search history.

(56) References Cited

U.S. PATENT DOCUMENTS

| | | | | |
|---|---|---|---|---|
| 4,985,825 A * | 1/1991 | Webb, Jr. | ............ | G06F 9/3865 711/169 |
| 5,361,340 A * | 11/1994 | Kelly | ................ | G06F 12/0831 711/146 |
| 6,145,064 A * | 11/2000 | Long | ................... | G06F 12/1018 711/158 |
| 6,516,386 B1 * | 2/2003 | Pang | ................... | G06F 12/1054 711/118 |
| 2004/0073768 A1* | 4/2004 | Bottemiller | .......... | G06F 12/123 711/207 |
| 2006/0143405 A1* | 6/2006 | Ishikawa | ............. | G06F 12/0855 711/141 |
| 2008/0101605 A1* | 5/2008 | Kitamura | ......... | H04N 21/23103 380/239 |
| 2011/0066790 A1* | 3/2011 | Mogul | .................. | G06F 12/023 711/103 |
| 2014/0040593 A1* | 2/2014 | Sharp | .................. | G06F 12/1009 711/206 |
| 2016/0019157 A1* | 1/2016 | Palacharla | .......... | G06F 12/0893 711/3 |
| 2017/0262299 A1* | 9/2017 | Chow | ..................... | G06F 9/455 |

(Continued)

OTHER PUBLICATIONS

Architectural Support for Translation Table Management in Large Address Space Machines by Huck (Year: 1993).*

(Continued)

*Primary Examiner* — Paul M Knight
(74) *Attorney, Agent, or Firm* — Kilpatrick Townsend & Stockton LLP

(57) ABSTRACT

A contiguous region in memory may be configured to store data so that a first portion of the data is addressable using a first indexing scheme and a second portion of the data is addressable using a second indexing scheme. The first portion of the data may include information which may be used by one entity and the second portion of the data may include different information which may be used by another entity.

20 Claims, 8 Drawing Sheets

(56) References Cited

U.S. PATENT DOCUMENTS

2017/0269954 A1* 9/2017 Hardy ................. G06F 9/45558
2018/0157595 A1* 6/2018 Jindal ..................... G06F 3/061

OTHER PUBLICATIONS

Virtual Memory: Issues of Implementation by Mudge (Year: 1998).*
SpaceWire User's Guide by Parkes (Year: 2012).*
Improving Performance of Large Physically Indexed Caches by Decoupling Memory Addresses from Cache Addresses by Min (Year: 2001).*

* cited by examiner

INDEXING A MEMORY REGION

BACKGROUND

In computer systems, hierarchical data storage may be used for storing the mapping information between logical addresses and physical addresses. For example, the hierarchical data storage may include a translation lookaside buffer (TLB) configured as a cache device, and a translation table stored in memory. In most instances, some additional information associated with the mappings may also be stored, which may be useful to implement various management operations, e.g., data migration.

BRIEF DESCRIPTION OF THE DRAWINGS

Various embodiments in accordance with the present disclosure will be described with reference to the drawings, in which.

DETAILED DESCRIPTION

Figure 1A:
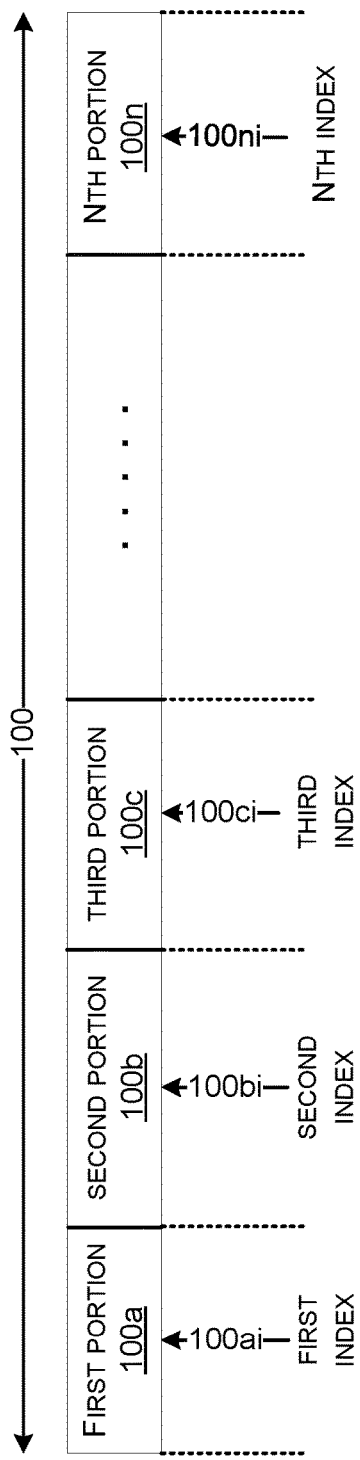
FIG. 1A illustrates a memory region configured to store data comprising multiple portions which are addressable using different indexing schemes, in some embodiments of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Server computers may be used to host data and to provide services to multiple clients or organizations. Generally, a server computer may utilize various data storage devices to store different types of data, e.g., user data, system data, etc. The data storage devices may include different types of volatile or non-volatile memory devices, e.g., dynamic random access memories (DRAMs), static random access memories (SRAMs), flash devices, storage class memories (SCMs), hard drives, etc. The SRAM and DRAM devices may typically provide non-persistent data storages (e.g., the stored data may be erased when power supply to those devices is off) but may have limited capacity. The hard drives may be used to provide bulk data storage for data that need not be accessed immediately. For example, the hard drive can be used to store backup data, or data files related to other applications that are not currently running in the server computer.

The SCM devices may be used, for example, as a buffer device between the DRAM device and the hard drive. The SCM devices can provide persistent storage for data and may include, e.g., flash-based NAND devices, resistive random-access memory (RRAM) devices, etc. The SCM devices can also provide higher access speed as compared to hard drives. Moreover, the SCM devices can be organized as dual in-line memory modules (DIMM), in the same form as DRAM DIMMs. The SCM DIMMs can also be connected to a board through the same high speed interfaces designed for DRAM DIMMs, which can improve the data transfer speed of SCM DIMMs. In some implementations, the SCM devices may be connected via dedicated SCM memory controllers. In further embodiments other configurations and interfaces can be used for the SCM.

Although SCM devices can provide substantial performance improvement (e.g., access speed) compared with conventional hard drives, the SCM devices have limited write endurance, which can affect the reliability of the SCM devices. The write endurance sets a limit of a total number of write operations the SCM devices may receive before the SCM devices degrades and introduces errors in the stored data. In some implementations, wear leveling may be performed to improve the reliability of the SCM devices. For example, write counts for each SCM block may be tracked and when the write count exceeds a certain threshold, data migration may be performed to copy or move the data from a heavily worn SCM block to a lightly worn or unused SCM block. In some instances, data migration may also be performed in response to a write failure.

In server computers, hierarchical data storage may be used for storing the mapping information between logical addresses associated with a host device and physical addresses associated with memory. For example, the hierarchical data storage may include a translation lookaside buffer (TLB) configured as a cache device, and a translation table stored in a local memory. The logical address may correspond to an address space supported by a host processor. When a mapping is not found in the TLB, the translation table may be looked up to find the mapping. In some implementations, the SCM devices may utilize a single level translation table, which may be stored in a private memory (e.g., a random access memory). The translation tables for the SCM devices may store all the mappings between the logical addresses generated by the host device and the corresponding physical addresses, and therefore page faults may not occur. The translation tables may also store additional indicators along with the mappings for management of the TLB entries storing those mappings. For example, the additional indicators may include a lock indicator and an eviction hint indicator which may be used to indicate eviction policies of the TLB entries. However, in order to have all the translations in the memory available at all times, a very large storage space may be required. For example, in some implementations, for 32 terabytes of an SCM device, 8 gigabytes of the volatile memory space may be needed for the translation table to store all the mappings.

In most instances, some additional information associated with the mappings may also be stored, which may be useful to implement various management operations, e.g., data migration. For example, the translation tables may typically store some additional information associated with each physical address along with the mappings. In some implementations, a respective dirty indicator may also be stored for each physical address. The dirty indicator may indicate that an SCM block is in active use and, therefore the data from this SCM block may need to be copied to another SCM block for wear leveling. In some implementations, even though the physical address can be looked up in the translation table for a given logical address to store the dirty indicator along with its respective physical address, however, this may be unnecessary since information associated with the physical address is specific to the physical address and can be tagged specifically to the physical address, irrespective of which logical address is associated for the time being with the physical address.

In some implementations, separate tables may be used to store the physical address and the information associated with the physical address for a number of entries. However, having two tables with the same number of entries may not be the most efficient use of space. For example, in some implementations, a first data structure may be used for a first table to store the physical address, the lock indicator and the eviction hint indicator, and a second data structure may be used for a second table to store the dirty indicator. As an example, the physical address may be 31-bits, and the lock indicator, eviction indicator and the dirty indicator may be 1-bit each. A 64-bit wide table can be used to store 33-bits of data per entry (e.g., physical address, lock indicator and eviction indicator) and the remaining memory space may be reserved. Similarly, a second table can be used to store the information associated with the physical address, e.g., 1-bit wide dirty indicator per entry and the remaining memory space may be reserved. Thus, the overall memory space may be underutilized by having two separate tables. However, according to certain embodiments, in instances, where the number of entries is the same and one portion of the data is relatively larger than another portion of the data, overlaying the two data structures on top of each other can allow an efficient use of the memory space. For example, instead of having two separate tables, a single 64-bit table may be used with 48-bits allocated to the first data structure and the 16-bits allocated to the second data structure. Thus, by utilizing the reserved space of each data structure, the overall amount of memory space can be conserved.

Some embodiments of the disclosed technologies can provide access to a contiguous region in memory using different indexing schemes. For example, a contiguous region in the memory may indicate a region in the memory that is addressable using a linear address. The contiguous region in the memory may correspond to one or more entries in a translation table. According to certain embodiments, the translation table may be accessed using different indexing schemes. An indexing scheme may indicate a type of index, e.g., an address, a hash, etc. The translation table may be configured to store one or more entries and each entry may store data comprising a respective first data portion and a respective second data portion. The first data may be addressable using a first indexing scheme and the second data portion may be addressable using a second indexing scheme. In some embodiments, a first portion of the data or a first data portion may be addressable using a first index and a second portion of the data or a second data portion may be addressable using a second index. Each index may belong to a different address space. For example, the first index may be a logical address belonging to a logical address space and the second index may be a physical address belonging to a physical address space. The first data portion for each translation table entry may be configured to store the physical address for a physical memory block in a data storage device. The first data portion may also be configured to store one or more indicators for the TLB management, e.g., lock indicators, eviction hint indicators, etc., which may also be indexed using the logical address. The second data portion may be configured to store information associated with the physical address. For example, the second data portion may store one or more indicators associated with the physical memory blocks, e.g., dirty indicators, etc., which may be indexed using the physical address.

In some embodiments, the host device may send a request comprising a logical address to write to a data storage device. A TLB engine may look up for a mapping of the logical address to a physical address corresponding to a physical memory block in the data storage device using a TLB. If a mapping is found in the TLB (e.g., a TLB hit), the TLB engine may retrieve the physical address from the matching entry in the TLB and provide the physical address to a microcontroller subsystem. If no mapping is found in the TLB (e.g., a TLB miss), the TLB engine may use the logical address as an index to the translation table to determine the physical address from the first data portion of the translation table. The microcontroller subsystem may be configured to use the physical address as an index to the second data portion to update a dirty indicator in the second data portion. The physical address may be retrieved from the TLB on a TLB hit, or from the translation table on a TLB miss. The dirty indicator may be set to indicate that the physical memory block associated with the physical address has valid data so that the data from this physical memory block may be moved to another physical memory block for data migration. For example, in some instances, data migration may be performed from one block (e.g., heavily worn block) to another block (e.g., lightly worn or unused block) for wear leveling or on write failures.

The physical address may be provided to a memory controller to write to a physical memory block in the data storage device corresponding to the physical address. For TLB misses, the physical address may also be used as an index by the microcontroller subsystem to identify a second entry in the translation table which may store the dirty indicator associated with that physical address. The dirty indicator may be used by the microcontroller for wear leveling. Thus, the embodiments can allow accessing different portions of the data stored in a contiguous region in the memory using different indexing schemes. This may be more efficient as compared to storing different portion of the data in two different memory regions.

FIG. 1A illustrates a memory region 100 configured to store data comprising multiple portions which are addressable using different indexing schemes, in some embodiments of the disclosed technologies. The memory region 100 may be a contiguous region in a memory, e.g., a volatile memory or a non-volatile memory.

The memory region 100 may be configured to store data comprising a first portion 100*a*, a second portion 100*b*, a third portion 100*c* and an Nth portion 100*n*. In some implementations, each portion of the data may be stored using a separate data structure. According to some embodiments, each portion of the data may be addressable using a different indexing scheme, e.g., a physical address, a virtual address, a machine physical address, a hash function, etc. As shown in FIG. 1A, the first portion 100a of the data may be addressable using a first index 100ai, the second portion 100b of the data may be addressable using a second index 100bi, the third portion 100c of the data may be addressable using a third index 100ci, and the Nth portion 100n of the data may be addressable using an Nth index 100ni. Each of the first index 100ai, second index 100bi, third index 100ci and the Nth index 100ni may belong to a different address space, e.g., a virtual address space, a physical address space, a hash table, or any suitable address space.

In some embodiments, different portions of the data may be used by different entities. For example, the first portion 100a may be used by a first entity, the second portion 100b may be used by a second entity, the third portion 100c may be used a third entity and the Nth portion 100n may be used by an Nth entity. For example, different entities may include microcontrollers, memory controllers, processors, TLB engines, DMA controllers, or any suitable circuit. Thus, the embodiments can provide a mechanism for storing different portions of the data with varying sizes, which are addressable using different indexing schemes, by overlaying multiple data structures on top of each other to conserve overall memory space. An example embodiment is explained with reference to FIG. 1B.

Figure 1B:
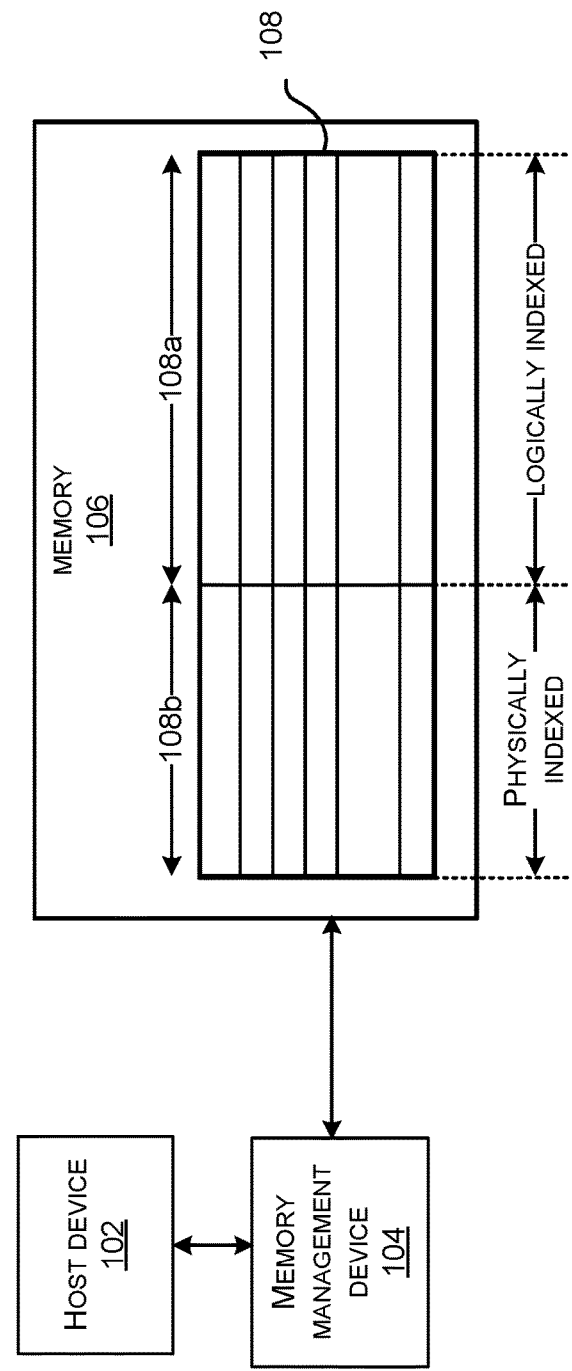
FIG. 1B illustrates an apparatus comprising a memory comprising a translation table configured to be physically indexed or logically indexed, in some embodiments of the disclosed technologies.

FIG. 1B illustrates an apparatus comprising a memory comprising a translation table configured to be physically indexed or logically indexed, in some embodiments of the disclosed technologies. The apparatus may also include a host device 102 and a memory management device 104 communicatively coupled to the memory 106. A contiguous region in the memory 106 may correspond to one or more entries in a translation table 108. The apparatus may be part of a computer system, e.g., a server computer.

The host device 102 may be configured to provide a logical address (also termed as a machine physical address) for access to a data storage device (not shown). The logical address may be mapped to a physical address corresponding to a physical memory block in the data storage device. The host device 102 may include a host processor configured to execute instructions stored in a computer readable medium. The logical address may correspond to the address space supported by the host processor. In virtualized systems, the logical address may be a virtual address belonging to a virtual address space associated with a virtual machine (VM) executing on the host device 102. The VM may initiate a request comprising the logical address to access the data storage device for a write or a read transaction. The logical address may be translated to a physical address corresponding to a physical memory block in the data storage device using the translation table 108. The physical address may belong to a physical address space assigned to the VM in the data storage device corresponding to the logical address space. For example, the data storage device may include a storage class memory, flash memory, dynamic random access memory (DRAM), synchronous DRAM, double data rate synchronous DRAM (DDR SDRAM), or any other suitable memory used for data storage.

A physical memory block may include a plurality of pages in the memory. Each page can be the smallest addressable unit by a logical address, e.g., 8 bytes. As an example, a physical memory block may include 512 consecutive pages, which may be equivalent to 4 kilobytes (512×8) of data. A physical memory block comprising 512 consecutive pages may be mapped to 512 logical addresses associated with those 512 consecutive pages. The 512 logical addresses may have common most significant bits. For example, in instances where the logical addresses have 32 bits, the most significant 20 bits (bits [31:12]) of the 512 logical addresses may be identical, whereas bits [11:3] (for indexing one of the 512 pages) and bits [2:0] (for indexing one of the eight bytes of a page) may have different values for different logical addresses.

The translation table 108 may be configured to store one or more entries. Each entry in the translation table 108 may be configured to store multiple data portions similar to the memory region 100 as discussed with reference to FIG. 1A. In some embodiments, each entry in the translation table 108 may be configured to store a respective first data portion 108a and a respective second data portion 108b. For example, the first data portion 108a may be addressable using a first indexing scheme and the second data portion 108b may be addressable using a second indexing scheme. According to some embodiments, the first data portion 108a may be logically indexed and the second data portion 108b may be physically indexed. For example, logically indexed may indicate using a logical address as an index to the translation table 108, and physically indexed may indicate using a physical address as an index to the translation table 108. The memory 106 may include a volatile memory that requires power to maintain the stored information. Some non-limiting examples of the volatile memory may include static random access memory (SRAM), DRAM, SDRAM, DDR SDRAM, etc. Note that the embodiments can support other types of memories configured to store data comprising portions which may be addressable using different indexing mechanisms, without deviating from the scope of the disclosed technologies.

The translation table 108 may be configured to store physical addresses in the first data portion 108a, which may be indexed using the logical address provided by the host device 102. The translation table 108 may also be configured to store other information in the first data portion 108a, which may be discussed in the later sections. The physical address retrieved from the translation table 108 may be used to write to the physical memory block in the data storage device, e.g., using a memory controller. The translation table 108 may also be configured to store one or more indicator bits in the second data portion 108b, which may be indexed using the physical address retrieved from the first data portion 108a. In some implementations, each entry in the translation table 108 may be configured to store 64-bits, wherein the first data portion 108a may include 48-bits and the second data portion 108b may include 16-bits.

In some embodiments, the memory management device 104 may be configured to receive a logical address from the host device 102 via an interface. The memory management device 104 may be further configured to use the logical address as an index to the memory 106 to retrieve a physical address from the translation table 108. For example, the memory management device 104 may identify a first entry in the translation table 108 using the logical address as the first index and retrieve the physical address from the first data portion 108a of the first entry. The memory management device 104 may further identify a second entry in the translation table 108 using the physical address as a second index to the translation table 108 to update the second data portion 108b. The second data portion 108b may include one or more indicator bits, e.g., a dirty indicator. The memory management device 104 may be further configured to update the dirty indicator in the second data portion 108b of the second entry. In some embodiments, the memory management device 104 may update the dirty indicator to indicate that a physical memory block in the data storage device corresponding to this physical address includes valid data. For example, the dirty indicator associated with a physical address may be used in data migration to determine whether the data in this physical memory block has to be copied to another location.

Some embodiments of the disclosed technologies can allow accessing a portion of the translation table using one type of index and another portion of the translation table using another type of index. Information retrieved from different portions may be used by different entities. Thus, the ability to save different information with varying sizes in different portions of the translation table can minimize the use of having two separate tables in the memory.

Figure 2:
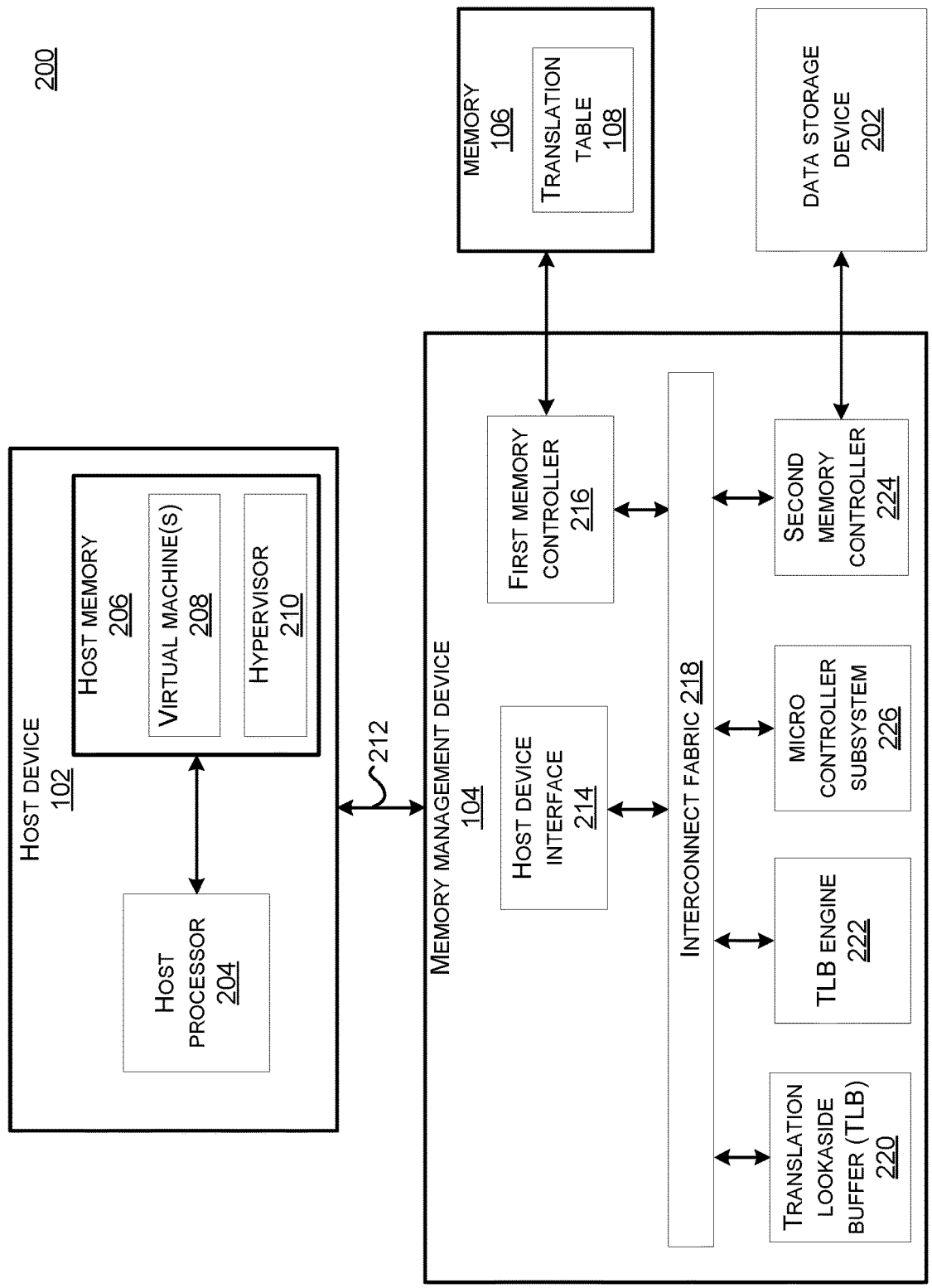
FIG. 2 illustrates an apparatus comprising a memory management device coupled to the host device, the memory and a data storage device, in one embodiment of the disclosed technologies.

FIG. 2 illustrates an apparatus 200 comprising the memory management device 104 coupled to the host device 102, the memory 106 and a data storage device 202, in one embodiment of the disclosed technologies. The apparatus 200 may be part of a computer, e.g., a server computer.

The host device 102 may include a host processor 204 configured to execute instructions stored in a computer readable medium, e.g., in the form of a computer program. For example, the instructions may be stored in a host memory 206 communicatively coupled to the host processor 204. The host memory 206 may be internal or external to the host device 102. In some implementations, the host memory 206 may be configured to store instructions to execute virtual machine(s) 208 and a hypervisor 210. In some embodiments, the host processor 204 may include processors developed by ARM®, MIPS®, AMD®, Qualcomm®, and the like. The host memory 206 may include volatile memory, non-volatile memory, or a combination thereof, e.g., SRAMs, DRAMs, EPROMs, flash, etc. It will be understood that the host device 102 may include other components which are not shown here for the purposes of simplicity. For example, the host device 102 may include bus controllers, direct memory access (DMA) controllers, memory controllers, caches, etc.

In some embodiments, the host device 102 may be configured to run instances, such as virtual machine instances (e.g., VMs 208) for different clients or organizations. The VMs 208 may access computer hardware via the hypervisor 210, or bare-metal instances which run directly on the computer hardware. In most cases, instances, such as bare-metal or VM instances, in a multi-tenant compute system may be allocated to a client when the client needs them and decommissioned when they are no longer needed, such that the resources can be reallocated to other clients. Different types of VM instances may generally provide different hardware functions or arrangements.

Generally speaking, virtualization is the creation of one or more logical systems from a single physical system. The hypervisor 210 or a virtual machine manager (VMM) can emulate a single device as multiple virtual devices in a virtualized environment. The hypervisor 210 may be configured to manage one or more VMs on the host device 102, for example, to create, start, monitor, stop or delete the VMs 208. In some implementations, the hypervisor 210 can manage access controls, resources, scheduling, isolation, etc. for the VMs 208. A VM may be any suitable emulation of a computer system that may be managed by the hypervisor 210. The hypervisor 210 can also manage the flow of information among software, the virtualized hardware, and the physical hardware. Virtualization can allow multiple VMs to run on the same hardware system in their respective guest operating systems on the host device 102. Each active VM may be assigned a memory region in the data storage device 202.

The memory management device 104 may include a host device interface 214, a first memory controller 216, an interconnect fabric 218, a translation lookaside buffer (TLB) 220, a TLB engine 222, and a second memory controller 224 and a microcontroller subsystem 226. The memory management device 104 may be coupled to the memory 106 comprising the translation table 108 as discussed with reference to FIG. 1. The memory management device 104 may also be coupled to the data storage device 202. The memory management device 104 may be implemented as a field programmable gate array (FPGA), system-on-chip (SoC), or any suitable circuit.

In some embodiments, the data storage device 202 may include a storage class memory (SCM) and the memory management device 104 may be configured to implement functionality of memory channels connected to SCM modules. SCM devices may include, e.g., flash-based NAND devices, resistive random-access memory (RRAM) devices, etc., that can provide persistent storage for data. The SCM devices can also provide higher access speed (compared with hard drives). For example, some SCM devices can include RRAM devices that can provide superior access speed compared with, e.g., magnetic disks, and certain flash-based NAND devices. Moreover, the SCM devices can be organized as dual in-line memory modules (DIMM), in the same form as DRAM DIMMs. The SCM DIMMs can also be connected to the board through the same high speed interfaces designed for DRAM DIMMs, which can improve the data transfer speed of SCM DIMMs. In some implementations, the SCM devices may be connected via dedicated SCM memory controllers. In some other implementations, the SCM devices can operate as an auxiliary DRAM device to provide additional byte-addressable storage for different applications. In other implementations, the SCM devices may also operate as an auxiliary (or alternative) high speed hard drive to provide block-addressable storage. It will be understood that the embodiments are not limited to storage class memory devices and can be applied to other types of memory devices, e.g., DRAMs, without deviating from the scope of the disclosed technologies.

In some embodiments, the memory 106 may be a private memory (e.g., a private DRAM) for the memory management device 104. The translation table 108 may be configured to store physical addresses mapped to the logical addresses and some other information that may be used by the TLB engine 222 or the microcontroller subsystem 226. An example translation table is explained with reference to FIG. 3.

Figure 3:
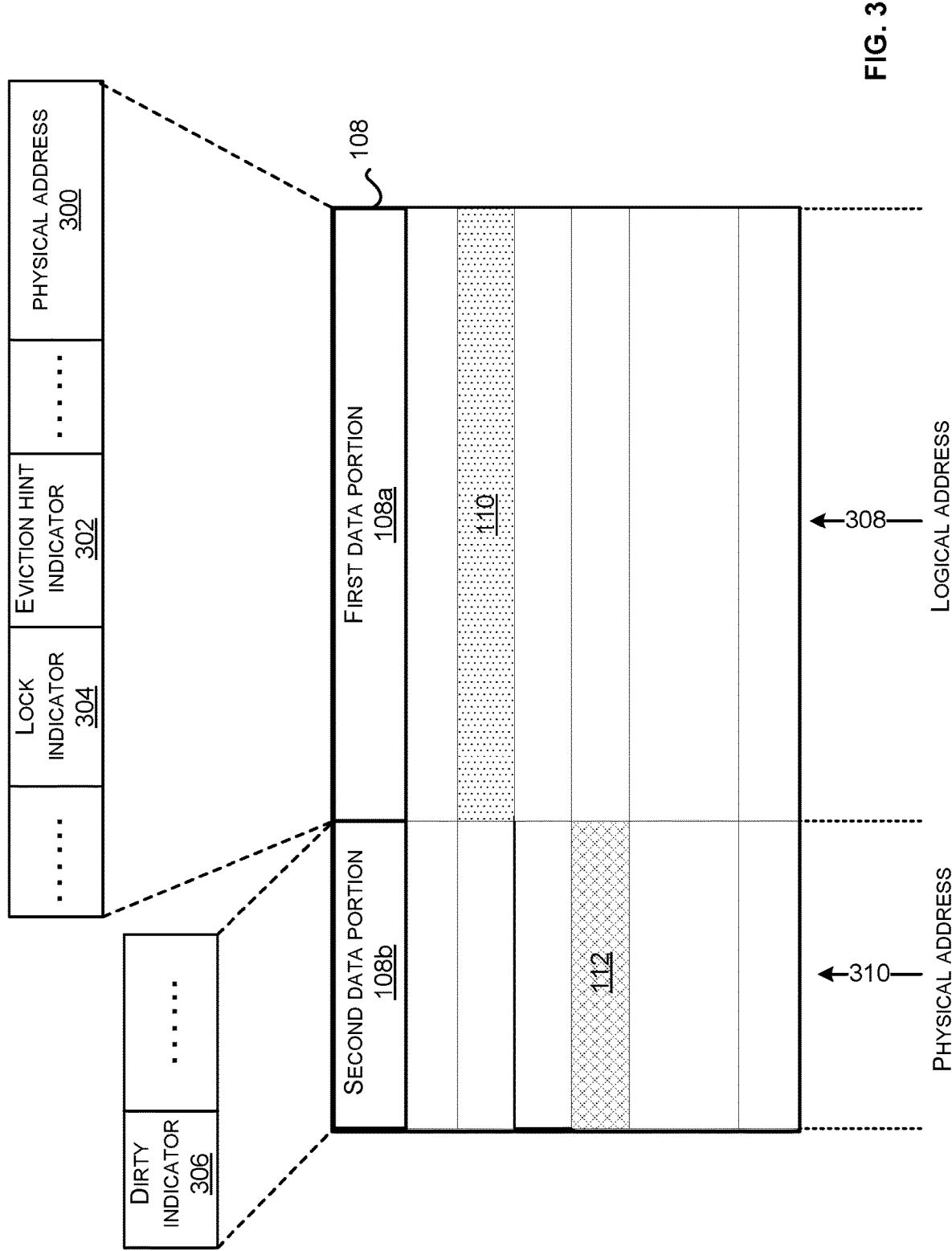
FIG. 3 illustrates an example of the translation table, in one embodiment of the disclosed technologies.

FIG. 3 illustrates an example of the translation table 108, in one embodiment of the disclosed technologies. The translation table 108 may include the first data portion 108a which may be indexed using a first index, and the second data portion 108b which may be indexed using a second index. The first index may be a logical address 308 belonging to a logical address space associated with the host processor 204. The second index may be a physical address 310 belonging to a physical address space in the data storage device 202 mapped to the logical address space. In some implementations, the translation table 108 entries may be 64-bits each. The upper two bytes may be physically indexed, and the lower six bytes may be logically indexed. In some implementations, the translation table 108 may be a direct mapped, single level page table in the memory 106. A base address of the translation table 108 may be programmable. The logical address 308 provided by the host device 102 may be described in terms of an offset from the base address. In some embodiments, the translation table 108 may be initialized at power-up by the microcontroller subsystem 226 by assigning a physical memory block for every logical page.

In some embodiments, the first data portion 108*a* may include a physical address 300, an eviction hint indicator 302, and a lock indicator 304 in addition to one or more reserved bits. The first data portion 108*a* may be indexed using the logical address 308. The logical address 308 may be provided by the host device 102 via the interface 212. In some implementations, the first data portion 108*a* may be 48-bits, out of which the eviction hint indicator 302 and the lock indicator 304 may be one bit each and the physical address 300 may be 31-bits. Remaining bits may be reserved.

In some implementations, the physical address 300 may represent a physical memory block number associated with a physical memory block, which may represent a set of physical addresses in the data storage device 202. Each physical memory block may include a plurality of pages and each page can be the smallest addressable unit. According to some embodiments, the number of physical pages in the data storage device 202 may be the same as the number of logical pages. Therefore, the translation table 108 may include a valid physical address for a physical memory block for every machine physical address or logical address. As an example, assuming the page offset to be 4 kilobytes (e.g., logical address bits [11:0]), the 31-bits physical address 300 may be obtained using the logical address bits [42:12].

Both the eviction hint indicator 302 and the lock indicator 304 may be associated with the logical address 308 and can indicate certain policies for processing of the logical address 308. For example, the lock indicator 304, when asserted, can indicate that the logical address (and the mapped physical address), once loaded into the TLB 220, is to remain in the TLB 220 and not to be evicted to make way for other logical address mapping (in the case where the TLB 220 is full), so that the translation of that logical address (and the associated access request) can proceed more quickly. Moreover, the eviction hint indicator 302, when asserted, can indicate that the logical address (and the mapped physical address) can be evicted from the TLB 220 if the TLB 220 is full. Both the eviction hint indicator 302 and the lock indicator 304 may be provided by a VM instance (e.g., as part of the access request including the logical address) to indicate a priority of handling the translation of the logical address 308 as well as the associated access request. For example, in a case where the access request associated with a logical address is of lower priority, the VM instance may de-assert the lock indicator 304 and assert the eviction hint indicator 302 for that logical address, to indicate that the mapping between the logical address and the physical address, once stored in the TLB 220, can be evicted from the TLB 220. As shown in FIG. 3, using a logical address as the index to the first data portion 108*a*, a first entry 110 may be identified which may include a mapping to a physical address for the given logical address.

In some embodiments, the second data portion 108*b* may include information associated with the physical memory block corresponding to the physical address 300, e.g., a dirty indicator 306. In some implementations, the second data portion 108*b* may be 16-bits, out of which dirty indicator 306 may be one-bit and the remaining bits may be reserved. The second data portion 108*b* may be indexed using the physical address 310, which may be the physical address 300 retrieved from the first data portion 108*a*, or the physical address provided by the TLB engine 222. For example, on a TLB miss, the second data portion 108*b* may be indexed using the physical address 300 retrieved from the first data portion 108*a* using the logical address 308. On a TLB hit, the physical address 310 may be provided by the TLB engine 222 since the mapping already exists in the TLB 220. As shown in FIG. 3, using the physical address 310, a second entry 112 may be identified which may include the dirty indicator associated with that physical address. The dirty indicator, when asserted, may be used to indicate to the microcontroller subsystem 226 that the physical memory block is in active use. The active use may indicate that the data stored in the physical memory block is valid data. For example, in some instances, if this physical memory block is used in migration for wear leveling or for some other purposes, the data stored in the physical memory block may have to be migrated to another physical memory block instead of overwriting the data.

In some implementations, for SCM devices, wear leveling may be performed to keep the write count to different SCM blocks comparatively leveled across the SCM device. For example, the dirty indicator 306 associated with an SCM block (e.g., corresponding to the physical address 300) can be set when that SCM block is written. When the data needs to be moved for wear leveling from one physical memory block to another, the dirty indicator 306 may be checked to determine if the SCM block is in active use so that the data from a heavily used SCM block may be moved to a lightly used or unused SCM block. The dirty indicator 306 may be cleared when that SCM block is no longer in use, e.g., the VM associated with that memory region is decommissioned or ended. On the other hand, if the dirty indicator 306 indicates that the target physical memory block does not contain active data (e.g., data earmarked for deletion, no valid data is stored, etc.), the microcontroller subsystem 226 can overwrite the target physical memory block with the migration data. After the data migration completes, the microcontroller subsystem 226 may assert the dirty indicator 306 associated with the target physical memory block to which the data is migrated to indicate that the target physical memory block is in active use.

Referring back to FIG. 2, the host device interface 214 may be used to communicate with the host device 102 via one or more interfaces 212 based on the bus protocol implemented by the interface 212. For example, the interfaces 212 may implement Peripheral Component Interconnect Express (PCIe), Ultrapath Interconnect (UPI) or any suitable protocol for high speed buses. In some implementations, the host device interface 214 may include a PCIe endpoint and/or a UPI endpoint. The PCIe interface may provide a high bandwidth, non-cacheable memory interface, while the UPI interface may provide a low latency, cacheable memory interface. In some embodiments, the interfaces 212 may include a number of PCIe links to match the throughput of the PCIe interface to the throughput of the memory channels for communicating with the data storage device 202. The memory management device 104 may receive a request from the host device 102 to access the data storage device 202 via the interface 212. For example, the request may include data for writing to the data storage device 202 for a given logical address or reading from the data storage device 202 for the given logical address. The host device interface 214 may be used to receive the data from the host device 102 for writing to the data storage device 202 or to provide the data read from the data storage device 202 via the second memory controller 224 to the host device 102.

In some embodiments, the interconnect fabric 218 may be based on, e.g., an Advanced Extensible Interface (AXI) interface. An access request to the data storage device 202 may be in the form of an AXI read request or an AXI write request. Note that other implementations of the interconnect fabric 218 are possible without deviating from the scope of the disclosed technologies, e.g., buses, matrix, switches, etc.

The TLB 220 may be configured as a cache device to store a subset of logical addresses provided by the host device 102 and the mapped physical addresses in the data storage device 202, to provide fast access to the subset of physical addresses. In some embodiments, the TLB 220 may be implemented as a hash table. For example, the logical address provided by the host device 102 may be used as an input to a hash function for lookups. In some implementations, CRC16 with two different polynomials may be used as hash functions. In some embodiments, each TLB entry may include a virtual machine identifier (VMID), a lock indicator bit, an eviction hint indicator bit, a physical address corresponding to a physical memory block number, a valid indicator bit, a write count, a least recently used (LRU) count, and a logical address.

The VMID can be a unique identifier assigned by the hypervisor 210 to identify a VM instance. A VM instance can be assigned a VMID during the life time of the instance (e.g., from the time the instance was created to the time the instance was shut down), and can be included in part of the access request (e.g., an AXI read request, an AXI write request, etc.) generated by the VM instance and transmitted by host processor 204. The write count for a logical address may include a counter that can be incremented whenever the TLB 220 receives a write request, and the logical address may be provided as an input logical address for translation to a physical address.

The lock indicator and the eviction hint indicator may be used to indicate an eviction policy for a TLB entry, as discussed with reference to the translation table 108 in FIG. 3. The valid indicator bit may indicate if the TLB entry is storing valid data. In the case of a TLB miss, the TLB engine 222 may determine that an entry is fully occupied based on whether the valid indicator for each entry is asserted, and that an entry is to be evicted to make room for new address mapping information fetched from the translation table 108. The LRU count may be used to provide an indication of how recently a TLB entry has been accessed so that the TLB engine 222 may use this information along with the lock indicator and the eviction hint indicator for evicting an entry based on the eviction policy.

The TLB engine 222 may be configured to receive a request comprising the logical address to access the data storage device 202. The request may be sent by the host device 102 using the bus protocol implemented by the interface 212, e.g., PCIe, UPI, etc. The TLB engine 222 may be configured to lookup the TLB 220 for a mapping of the logical address to a physical address corresponding to a physical memory block in the data storage device 202. If the TLB engine 222 determines that a mapping exists in the TLB 220 (e.g., a TLB hit), the TLB engine 222 may retrieve the physical address from the matching entry in the TLB 220.

If the TLB engine 222 determines that the mapping does not exist in the TLB 220 (e.g., a TLB miss), the TLB engine 222 may look up for the mapping in the translation table 108 stored in the memory 106 to determine a physical address corresponding to the logical address. According to the embodiments, the TLB misses do not result in page faults since there is always a translation stored in the translation table 108 for every logical address provided by the host device 102. The TLB engine 222 may identify a first entry (e.g., the first entry 110) in the translation table 108 using the logical address as an index to the translation table 108. The TLB engine 222 may determine the physical address corresponding to the logical address from the first data portion 108a of the first entry.

The TLB engine 222 may send the physical address to the second memory controller 224 to perform the access to the data storage device 202. The access may include a write transaction to the physical memory block in the data storage device 202 corresponding to the physical address or a read transaction from the physical memory block in the data storage device 202 corresponding to the physical address. If a write transaction is performed to the physical memory block in the data storage device 202, the TLB engine 222 may send a signal to the microcontroller subsystem 226 to update the dirty indicator 306 associated with the physical address in the second data portion 108b. In some embodiments, the TLB engine 222 may send an interrupt to the microcontroller subsystem 226 to update the dirty indicator 306. In some other embodiments, the TLB engine 222 may write to a queue (not shown) in the data storage device 202, which may be maintained by the microcontroller subsystem 226, to indicate that a physical memory block corresponding to the physical address 300 is dirty. The microcontroller subsystem 226 may be configured to poll the queue and update the dirty indicator 306 accordingly. In some embodiments, the TLB engine 222 may write to the second data portion 108b to update the dirty indicator 306 when a write is performed to the physical memory block corresponding to the physical address 300. The TLB engine 222 may further be configured to update the TLB 220 with the mapping for the physical address 300 received from the translation table 108 on the TLB miss. In some implementations, the TLB engine 222 may evict an entry from the TLB 220 based on the eviction policy to make room for the new entry.

The microcontroller subsystem 226 may be configured to identify a second entry (e.g., the second entry 112) in the translation table 108 using the physical address 310 as the index to the translation table 108. In some instances, the physical address 310 may be same as the physical address 300 retrieved from the first data portion 108a. The microcontroller subsystem 226 may be configured to update the dirty indicator in the second data portion of the second entry. For example, the microcontroller subsystem 226 may assert the dirty indicator to indicate that the physical memory block corresponding to the physical address 310 is in active use or has valid data. The microcontroller subsystem 226 may perform a read-modify-write operation to update the dirty indicator in the second data portion, or perform a write operation using appropriate write strobes to update the dirty indicator in the second data portion.

In some embodiments, the microcontroller subsystem 226 may also be configured to communicate with the hypervisor 210 for initial mapping of the translation table 108 at power-up. For example, the microcontroller subsystem 226 may assign a physical memory block in the data storage device 202 for every logical page corresponding to an address space associated with the host processor 204. The microcontroller subsystem 226 may isolate bad physical memory blocks or heavily worn pages to a particular local region in the data storage device 202. For example, a region may include a plurality of consecutive physical memory blocks in the data storage device 202. The microcontroller subsystem 226 may assign lightly worn pages near the front of the region in the data storage device 202. The microcontroller subsystem 226 may also create entries for the translation table 108 in the memory 106 to include address mappings, and with dirty indicator 306, lock indicator 304, and the eviction hint indicator 302 bits cleared.

In some embodiments, the microcontroller subsystem 226 may create data structures of available regions in the data storage device 202 and send this information to the hypervisor 210. The hypervisor 210 may assign the available regions to one or more VMs 208 accordingly as they are starting up. The hypervisor 210 may provide a virtual machine identifier (VMID) associated with the VM to the microcontroller subsystem 226 when a VM is starting up so that the microcontroller subsystem 226 can update the data structures to indicate which VMID is assigned to that region.

In some embodiments, the hypervisor 210 may message the microcontroller subsystem 226 when a VM associated with a VMID is shutting down. The microcontroller subsystem 226 may determine the region assigned to that VMID. The microcontroller subsystem 226 may communicate with the TLB engine 222 to re-initialize the translation table 108 for that region, e.g., by clearing the lock indicator, eviction hint indicator and dirty indicator for all the translation table entries in that region. For example, for each logical page in that region, the TLB engine 222 may identify a first entry in the translation table 108 using a respective logical address as an index and determine if the lock indicator and the eviction hint indicator bits are asserted (e.g., set to one). The TLB engine may write the translation table 108 using the respective logical address as the index to clear the lock indicator and the eviction hint indicator bits, if necessary. The microcontroller subsystem 226 may write the translation table 108 using the respective physical address corresponding to each logical address to clear the respective dirty indicator bits. In some implementations, the lock indicator, eviction hint indicator and the dirty indicator bits may be cleared using respective read-modify-write operations. In some other implementations, the lock indicator, eviction hint indicator and the dirty indicator bits may be cleared using appropriate write strobes to write to specific portions of the entry. The microcontroller subsystem 226 may message the hypervisor 210 that the shutdown for that VMID has completed so that the VMID can be reused.

The first memory controller 216 may be configured to communicate with the memory 106 to perform write or read accesses to the translation table 108. For example, the first memory controller 216 may provide the address, control signals and data for writing to the translation table 108. In some implementations, the first memory controller 216 may also implement functionalities to perform encryption, decryption, error correction and detection, etc. for the memory 106. The first memory controller 216 may include a DRAM controller, a DDR memory controller, or any suitable memory controller based on the type of the memory 106.

The second memory controller 224 may be configured to communicate with the data storage device 202 to perform write or read accesses to the data storage device 202. For example, the second memory controller 224 may provide the physical addresses translated using the TLB 220 or the translation table 108 along with the control signals to write to the physical memory block or read from the physical memory block corresponding to the physical address in the data storage device 202. For a write transaction, the physical memory block in the data storage device 202 may be written at the physical address with the data provided by the host device 102 as part of the request. For a read transaction, data read from the physical memory block at the physical address may be provided to the host device 102 via the host device interface 214. In some embodiments, if the data storage device 202 includes a storage class memory, the second memory controller 224 may include a SCM controller. In some embodiments, the second memory controller 224 may implement functionalities to perform error detection, error correction, encryption, decryption, transaction reordering, error correcting code (ECC) scrubbing, refresh, write failure handling, etc., which are not discussed in this specification for the purposes of simplicity.

As discussed with reference to FIG. 2 and FIG. 3, the information retrieved from different portions of the translation table 108 may be used by different entities. For example, the first portion 108a of the translation table 108 may be indexed using the logical address 308 provided by the host device 102 and the information retrieved from the first portion 108a may be used by the TLB engine 222. The second portion 108b of the translation table 108 may be indexed using the physical address 310 and the information retrieved from the second portion 108b may be used by the microcontroller subsystem 226. Thus, the certain embodiments can provide the ability to access different portions of the translation table entries by different entities using different indexing schemes by overlaying two data structures on top of each other and conserving memory space by utilizing the reserved spaces of the data structures.

Figure 4:
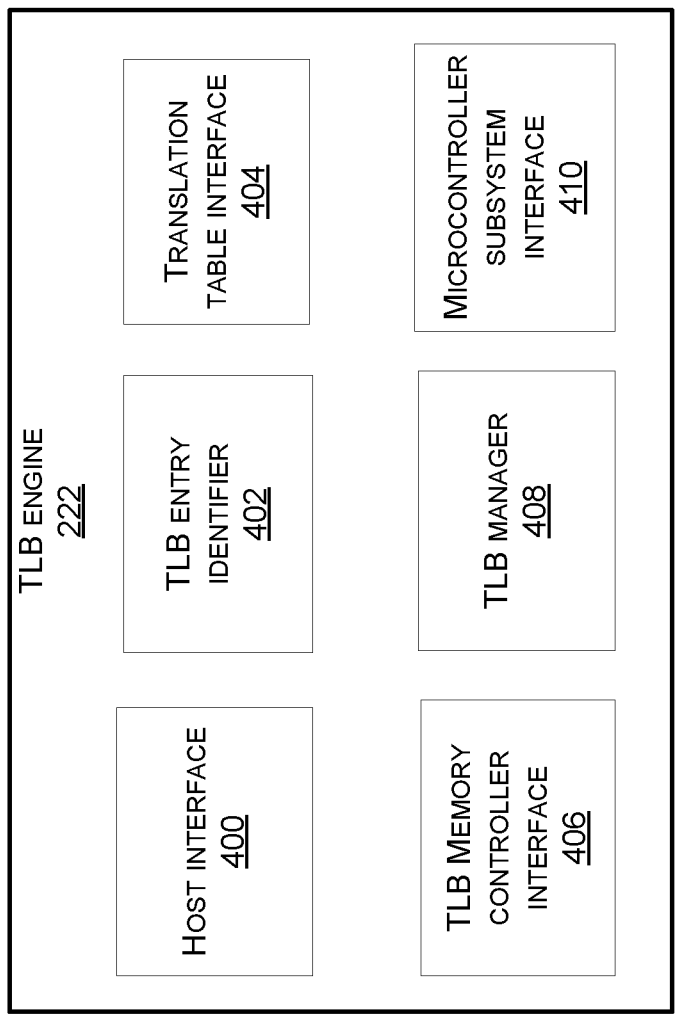
FIG. 4 illustrates components of a TLB engine, in one embodiment of the disclosed technologies.

FIG. 4 illustrates components of the TLB engine 222, in one embodiment of the disclosed technologies. In some implementations, the TLB engine 222 may include a host interface 400, a TLB entry identifier 402, a translation table interface 404, a TLB memory controller interface 406, a TLB manager 408, and a microcontroller subsystem interface 410.

The host interface 400 may be used for communication with the host device 102 via the interface 212. For example, the host interface 400 may be configured to receive a request comprising a logical address to write to the data storage device 202 or read from the data storage device 202. In some embodiments, the request may be generated by one of the VMs 208 executing on the host device 102. The request may include a VMID associated with the VM. In some embodiments, the logical address may be the bus transaction address based on the bus protocol implemented by the interface 212, e.g., PCIe, UPI, etc. In some embodiments, the TLB engine 222 or the memory management device 104 may be part of single-root I/O virtualization (SR-IOV), and may implement a virtual function (VF) to directly communicate with a virtual machine instance hosted by the host processor 204. In some embodiments, the logical address may be in the form of an AXI write address or an AXI read address.

The TLB entry identifier 402 may be configured to search the TLB 220 using the logical address. In some embodiments, the TLB entry identifier 402 may generate an index to search the TLB 220 by applying a hash function to the input logical address. If a match is found, which corresponds to a TLB hit, the physical address corresponding to a physical memory block stored in the matching entry may be provided to the TLB memory controller interface 406 to perform the access to the data storage device 202. In some instances, the physical address of the matching entry may be provided to the microcontroller subsystem 226 to update information associated with the physical address in the second data portion 108b. For example, the information may include the dirty indicator 306.

The translation table interface 404 may be used to communicate with the translation table 108 via the first memory controller 216. For example, when no matching entry is found in the TLB 220, the logical address may be provided to the first memory controller 216 to fetch a physical address for a physical memory block corresponding to the logical address. The physical address for the physical memory block provided by the translation table 108 may be inserted in the TLB 220 by the TLB manager 408. In some embodiments, the translation table interface 404 may be used to update the lock indicator 304 or the eviction hint indicator 302 in certain entries of the translation table 108 based on the instructions provided by the VM or the hypervisor 210 to update the corresponding values in the TLB 220. In some embodiments, the translation table interface 404 may be used to de-assert the lock indicator 304 and/or the eviction hint indicator 302 in certain entries of the translation table 108 associated with a region assigned to a specific VM, when the VM is shutting down. In some embodiments, the translation table interface 404 may be used to write to the translation table 108 to update the dirty indicator 306 in the second data portion 108b associated with a physical address when a write is performed to the physical memory block corresponding to the physical address.

The TLB memory controller interface 406 may be configured to provide the physical address to the second memory controller 224 to perform the write or the read access to the physical memory block in the data storage device 202 corresponding to the physical address. For example, the TLB memory controller interface 406 may be used to provide the physical address for the physical memory block retrieved from the TLB 220 (on a TLB hit) or from the translation table 108 (on a TLB miss). In some embodiments, the physical address for the physical memory block may be provided to the second memory controller 224 in the form of an AXI write address or an AXI read address. In some embodiments, the TLB memory controller interface 406 may be used to write to a queue (not shown) in the data storage device 202, which may be maintained by the microcontroller subsystem 226, to indicate that a physical memory block corresponding to a physical address is dirty.

The TLB manager 408 may be configured to manage the TLB entries. In some embodiments, the TLB manager 408 may manage eviction of the entries using the lock indicator and eviction hint indicator based on the VMID. For example, certain pages in the TLB 222 may be marked with the lock indicator and eviction hint indicator as programmed by the VM or by the hypervisor 210. The lock indicator may be used to indicate that the entry for that particular VMID can remain in the TLB 220 as programmed by the VM. The lock indicator in the TLB 220 may be loaded from the translation table 108 on a TLB miss or when the VM sets the lock indicator for a page already in the TLB 220. The eviction hint indicator may indicate that this entry may be a candidate for eviction as programmed by the VM. The eviction hint indicator in the TLB 220 may be loaded from the translation table 108 on a TLB miss or when the VM sets the eviction hint indicator for a page already in the TLB 220. In some instances, when the hypervisor 210 messages the microcontroller subsystem 226 when a VM is shutting down, the microcontroller subsystem 226 may send a message to the TLB engine 222 to re-initialize the translation table 108 for a region associated with the VM based on the VMID. The translation table interface 404 may be used to read the translation table entries using the logical address to retrieve the physical address and identify if the lock indicator 304 and the eviction hint indicator 302 are asserted. The TLB manager 408 may clear or de-assert the lock indicator 304 and the eviction hint indicator 302 in the first data portion 108b, if necessary, using the logical address. In some embodiments, a read-modify-write operation may be performed to assert or de-assert the lock indicator 304 and the eviction hint indicator 302. In other embodiments, the lock indicator 304 and the eviction hint indicator 302 may be asserted or de-asserted using the appropriate write strobes.

The TLB manager 408 may also be configured to keep track of the number of times a physical memory block has been written using the write count field. The write count field may be used for wear leveling. The TLB manager 408 may also be configured to keep track of which entry has the least recently used translations using the LRU count field. The TLB manager 408 may update these LRU counts on TLB hits and TLB misses and use the LRU counts in the selection of an entry for eviction on a TLB miss. In some embodiments, the TLB manager 408 may trigger flushing of the TLB 220 entries based on the VMID.

The microcontroller subsystem interface 410 may be configured to communicate with the microcontroller subsystem 226. In some implementations, the microcontroller subsystem interface 410 may be used to provide the physical address to the microcontroller subsystem 226. The physical address may be used as an index to retrieve information associated with the physical address from the second data portion 108b. For example, the information may include the dirty indicator 306. In some implementations, the microcontroller subsystem interface 410 may be configured to send a signal to the microcontroller subsystem 226 to update the dirty indicator in the translation table 108 using the physical address. In some embodiments, the signal may be in the form of an interrupt or a message.

Figure 5:
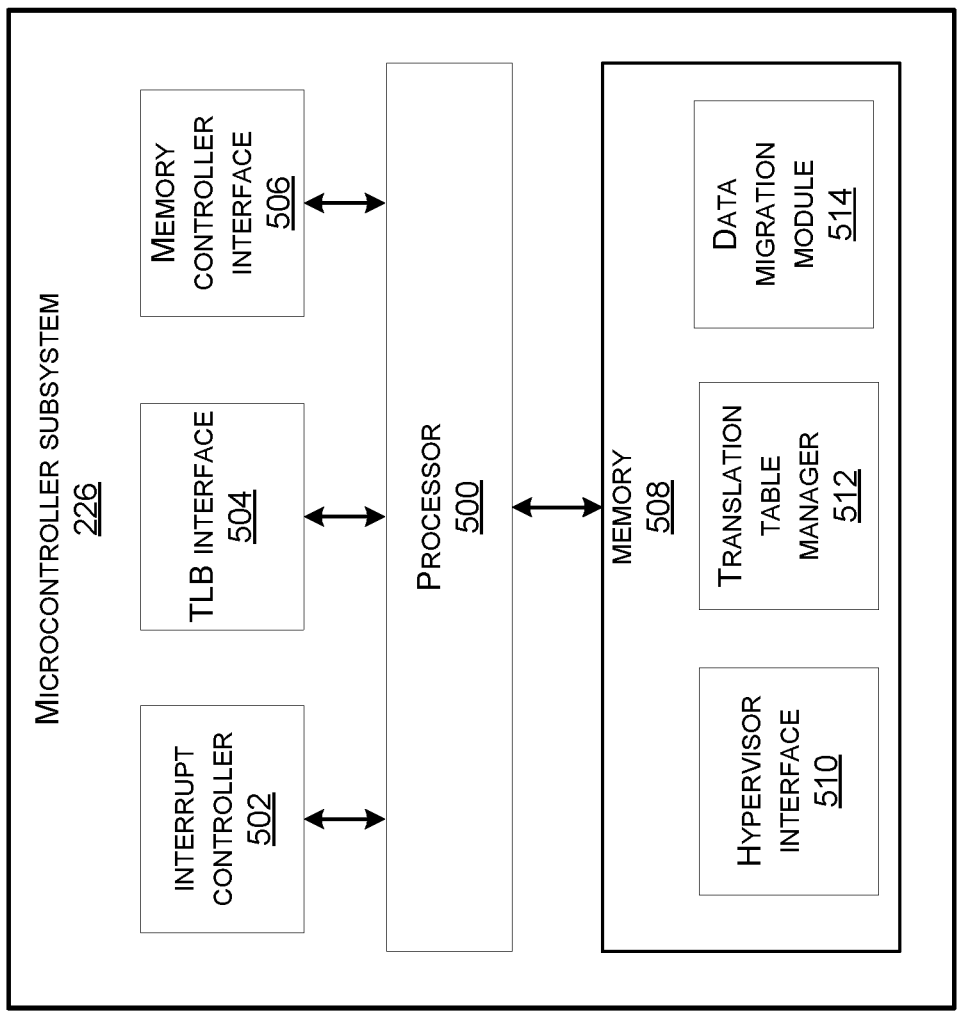
FIG. 5 illustrates components of a microcontroller subsystem, in one embodiment of the disclosed technologies.

FIG. 5 illustrates components of the microcontroller subsystem 226, in one embodiment of the disclosed technologies. In some implementations, the microcontroller subsystem 226 may include a processor 500 coupled to an interrupt controller 502, a TLB interface 504, a memory controller interface 506, and a memory 508.

The processor 500 may include one or more processor cores configured to execute instructions stored in the memory 508. For example, the memory 508 may include a computer readable medium configured to store instructions for a hypervisor interface 510, a translation table manager 512 and a data migration module 514. The memory 508 may include flash memory, ROM, EEPROM, DRAM, or any suitable memory configured to store instructions executable by the processor 500.

The interrupt controller 502 may be configured to receive an interrupt from the TLB engine 222. For example, the interrupt controller 502 may receive an interrupt via the microcontroller subsystem interface 410 to update a portion of an entry in the translation table 108 using the physical address as the index. For example, in some instances, updating may include doing a read-modify-write of a dirty indicator or asserting the dirty indicator using a write strobe in the second portion 108b of a translation table entry retrieved using the physical address. In some implementations, the processor 500 may retrieve the physical address from the TLB engine 222 as part of an interrupt service routine.

The TLB interface 504 may be used to communicate with the TLB engine 222. In some implementations, a signal or a message may be received from the TLB engine 222 via the TLB interface 504 to update the information associated with a physical address in the translation table 108 when a write to a physical memory block corresponding to the physical address is performed in the data storage device 202. In some implementations, the microcontroller subsystem 226 may communicate with the TLB engine 222 for the management of the TLB 220 when a VM is going to sleep or is shutting down. For example, when the hypervisor 210 messages the microcontroller subsystem 226 that the VM associated with the given VMID is going to sleep, the TLB interface 504 may be used to communicate with the TLB engine 222 to evict all the TLB entries for that VMID. In some instances, when the hypervisor 210 messages the microcontroller subsystem 226 that a VM associated with the given VMID is shutting down, the microcontroller subsystem 226 may identify the region assigned to that VMID and send a message or an interrupt to the TLB engine 222 to re-initialize the translation table 108 for the identified region. The TLB engine 222 may clear the lock and eviction hint indicators for all the entries in that region in the translation table using the logical address as the index. The microcontroller subsystem 226 can clear the dirty indicator using the physical address as the index.

The memory controller interface 506 may be used to communicate with the second memory controller 224, e.g., when a VM is starting up or shutting down. For example, when the hypervisor 210 messages the microcontroller subsystem 226 that a VM associated with the given VMID is going to start, the memory controller interface 506 may be used to communicate with the second memory controller 224 to find an available region in the data storage device 202 for the VM and also to generate a cryptographic key for the VM. The cryptographic key specific to a VM may be used by that VM for all accesses to the data storage device 202 to prevent unauthorized accesses. The microcontroller subsystem 226 can then send a message to the hypervisor 210 via the hypervisor interface 510 when the key generation is done and a data structure has been updated to indicate the region associated with that VMID. In some instances, the memory controller interface 506 may also be used to communicate with the second memory controller 224 when a VM is shutting down to identify a region assigned to the VM based on the VMID so that the second memory controller 224 can ignore accesses to the data storage device 202 associated with that VMID. The memory controller interface 506 may also be used to communicate with the second memory controller 224 to poll a queue in the data storage device 202 to determine that a physical memory block corresponding to a physical address in the data storage device 202 is dirty. If the physical memory block corresponding to the physical address in the data storage device 202 is dirty, the translation table manager 512 may be used to update the dirty indicator associated with the physical address in the translation table 108.

The hypervisor interface 510 may be used to communicate with the hypervisor 210 related to a number of operations, e.g., power up initialization, wear leveling, tracking statistics, VM startup, VM sleep, VM wakeup, and VM shutdown, etc. In some implementations, the microcontroller subsystem 226 may be part of single-root I/O virtualization (SR-IOV), and may implement a virtual function (VF) to directly communicate with the hypervisor 210 or a VM instance. In other implementations, a memory mapped interface may be used to communicate with the microcontroller subsystem 226. In some instances, the hypervisor 210 may send a VMID associated with the VM to message the microcontroller subsystem 226 when a VM is starting up, shutting down, waking up or sleeping. The microcontroller subsystem 226 can communicate with the TLB engine 222 or the second memory controller 224 to perform necessary operations related to the VM. Once those operations have been performed, the microcontroller subsystem 226 can send a message back to the hypervisor 210 using the hypervisor interface 510 to provide a status of the operations.

The translation table manager 512 may be configured to manage the entries in the translation table 108. For example, the translation table manager 512 may be configured to assert (e.g., set to one) or de-assert (e.g., set to zero, or clear) the dirty indicator 306 in the second data portion 108b of the translation table 108 using the physical address as the index. In some instances, the dirty indicator 306 may be asserted when a write to a physical address associated with the dirty indicator is performed. In some instances, the dirty indicator 306 may be de-asserted when a VM associated with a region corresponding to that physical address is shutting down. In some embodiments, a read-modify-write operation may be performed to assert or de-assert the dirty indicator 306. In some other embodiments, the dirty indicator 306 may be asserted or de-asserted by writing to the second data portion 108b using appropriate write strobes.

The data migration module 514 may be configured to perform data migration for wear leveling, in response to write failures, or for other relevant management operations. For example, data migration for wear leveling may be performed based on the write count statistics, number of errors associated per block, or using any other suitable criteria. In some embodiments, the data migration module 514 may perform data migration from a heavily worn block to a lightly worn block or an unused block. If the dirty indicator of a heavily worn block is asserted, it may be an indication that the physical memory block is in active use and the data from the physical memory block may need to be copied. If the target physical memory block being copied has its dirty indicator asserted, it may be an indication that the target physical memory block is in active use and the swap of the data between the source physical memory block and the target physical memory block may need to be performed. If the target physical memory block does not have its dirty indicator asserted, only one way copy from the heavily worn physical memory block to the target physical memory block may be performed. In some implementations, data migration may be performed using direct memory access (DMA) operations.

The data migration module 514 may also be configured to perform data migration in response to a write failure, e.g., when the stored data does not match the write data, and the data error is not correctable (e.g., based on error correction codes (ECC), or other schemes). The data migration module 514 may copy or move the data stored in that region to another region of the data storage device 202 associated with a relatively higher reliability. In addition, various error correction schemes may be implemented to further reduce the likelihood of data error.

Figure 6:
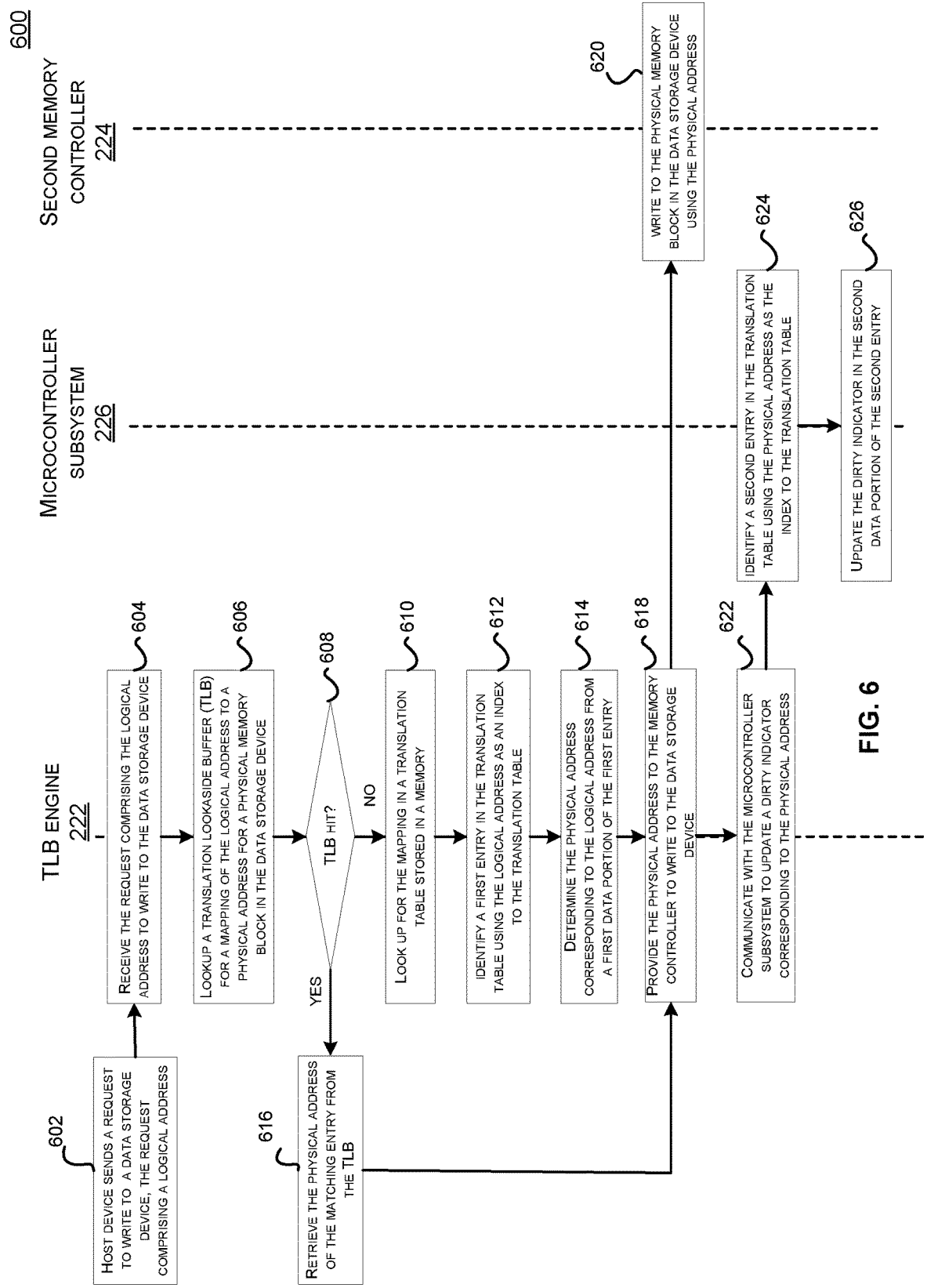
FIG. 6 illustrates communication between different components of an apparatus to allow access to a memory region using a logical address and a physical address, in one embodiment of the disclosed technologies.

FIG. 6 illustrates communication between different components of the apparatus 200 to allow access to a memory region using a logical address and a physical address, in one embodiment of the disclosed technologies.

In step 602, the host device 102 may send a request to write to the data storage device 202. The request may include a logical address. In some embodiments, the logical address may correspond to an address space associated with the host processor 204. The logical address may be mapped to a physical address in the data storage device 202. According to some embodiments, translation to the physical address from the logical address may be performed using the memory management device 104 and the translation table 108. As discussed with reference to FIG. 2, the request may be sent by the host processor 204 using the bus protocol implemented by the interface 212, e.g., PCIe, UPI, etc. In some embodiments, the request may be initiated by one of the VMs 208 executing on the host processor 204. It will be understood that the request may include other information, e.g., write or read controls, write data, etc., within the scope of the disclosed technologies.

In step 604, the TLB engine 222 may receive the request comprising the logical address to write to the data storage device 202. Referring back to FIG. 2, the TLB engine 222 may receive the request using the host device interface 214 via the interconnect fabric 218. In some embodiments, the interconnect fabric 218 may include an AXI interface and the logical address may be in the form of an AXI write address.

In step 606, the TLB engine 222 may look up the TLB 220 for a mapping of the logical address to a physical address for a physical memory block in the data storage device 202. As discussed with reference to FIG. 4, the TLB entry identifier 402 may be used to calculate an index using a hash function to search for an entry in the TLB 220.

In step 608, the TLB engine 222 may determine whether the mapping exists in the TLB 220, e.g., a TLB hit or a TLB miss.

In step 610, if no mapping is found in the TLB 220 (e.g., a TLB miss), the TLB engine 222 may look for the mapping in the translation table 108 stored in the memory 106. The translation table interface 404 of the TLB engine 222 may provide the logical address to the memory 106 via the first memory controller 216. According to some embodiments, the translation table 108 may be configured to store a mapping for each logical address supported by the host processor 204 to a corresponding physical address in the data storage device 202, so no page fault may occur on the TLB miss.

In step 612, the TLB engine 222 may identify a first entry in the translation table 108 using the logical address as an index to the translation table 108. Referring back to FIG. 3, the translation table 108 may include the first data portion 108a which can be indexed using the logical address, and the second data portion 108b which can be indexed using the physical address. The translation table interface 404 may identify a first entry 110 in the translation table 108 using the logical address as the index to the first data portion 108a.

In step 614, the TLB engine 222 may determine the physical address corresponding to the logical address from the first data portion 108a of the first entry 110. Referring back to FIG. 3, the physical address for the first entry 110 may be the physical address 300. As discussed with reference to FIG. 4, the TLB engine 222 may send the physical address 300 to the second memory controller 224 via the TLB memory controller interface 406.

In step 616, if a mapping is found in the TLB 220 (e.g., a TLB hit), the TLB engine 222 may retrieve a physical address of the matching entry from the TLB 220. Therefore, steps 610, 612, and 614 may be skipped, which include looking up for a mapping in the translation table 108 and determining the physical address from the translation table 108 using the logical address as the index.

In step 618, the TLB engine 222 may provide the physical address to the second memory controller 224 to write to the physical memory block in the data storage device 202 corresponding to the physical address. The physical address 300 may be retrieved from the TLB 220 on a TLB hit or from the translation table 108 using the logical address on a TLB miss.

In step 620, the second memory controller 224 may perform a write to the physical memory block in the data storage device 202 using the physical address 300. In some implementations, the data storage device 202 may be a storage class memory and the second memory controller 224 may be a storage class memory controller.

In step 622, the TLB engine 222 may communicate with the microcontroller subsystem to update a dirty indicator corresponding to the physical address. As discussed with reference to FIG. 4, the microcontroller subsystem interface 410 may send a signal or a message to the microcontroller subsystem 226 to update the dirty indicator 306 corresponding to the physical address. In some embodiments, the signal may be in the form of an interrupt and may be processed by the interrupt controller 502 of the microcontroller subsystem 226. In other embodiments, the TLB engine 222 may write to a queue in the data storage device 202 to indicate to the microcontroller subsystem 226 that a physical memory block corresponding to the physical address is dirty.

In step 624, the microcontroller subsystem may identify a second entry in the translation table using the physical address as the index to the translation table. Referring back to FIG. 5, the translation table manager 512 of the microcontroller subsystem 226 may identify a second entry in the translation table 108 using the physical address as the index to the translation table 108. For example, as shown in FIG. 3, the translation table manager 512 may identify the second entry 112 using the physical address 300 as the index. Note that in some instances, the second entry 112 and the first entry 110 may correspond to the same entry in the translation table 108, e.g., when the logical address and the physical address are the same.

In step 626, the microcontroller subsystem may update the dirty indicator in the second data portion of the second entry. As shown in FIG. 3, the translation table manager 512 may update the dirty indicator 306 in the second data portion 108b of the second entry 112. For example, updating the dirty indicator 306 may indicate asserting the dirty indicator 306 (e.g., setting to one) in the second data portion 108b. In some implementations, the dirty indicator 306 may be updated using appropriate write strobes to write only the second data portion 108b of the second entry 112. In some other implementations, the microcontroller subsystem 226 may read the second entry 112 to retrieve the dirty indicator 306 associated with the physical address 300 from the second data portion 108b and assert the dirty indicator 306. As discussed with reference to FIG. 5, asserting the dirty indicator 306 may indicate that that the physical memory block comprising the dirty indicator 306 has valid data so that the data migration module 514 may need to copy the data from this physical memory block to another block before performing data migration. For example, the data migration may be performed for wear leveling or in response to write failures.

Some embodiments of the disclosed technologies may be used for initializing the translation table 108 when a VM is shut down by the hypervisor 210. This is further explained with reference to FIG. 7.

Figure 7:
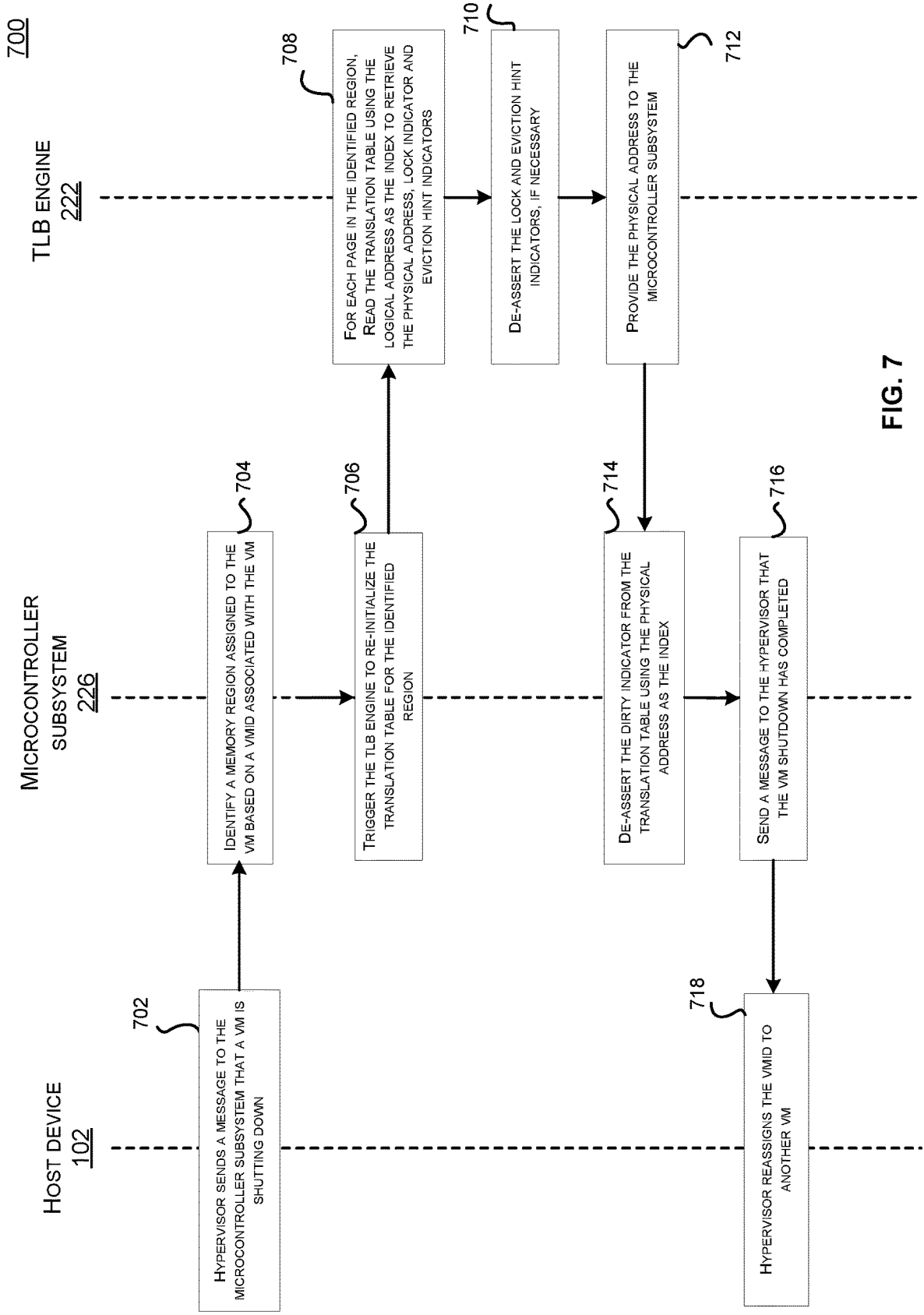
FIG. 7 illustrates communication between different components of an apparatus for re-initializing the translation table for a virtual machine shutdown, in one embodiment of the disclosed technologies.

FIG. 7 illustrates communication between different components of an apparatus for re-initializing the translation table for a virtual machine shutdown, in one embodiment of the disclosed technologies.

In step 702, the hypervisor 210 executing on the host device 102 may send a message to the microcontroller subsystem 226 that a VM is shutting down. For example, the VM may be one of the VMs 208. As discussed with reference to FIG. 2, the message may be sent by the host processor 204 using the bus protocol implemented by the interface 212, e.g., PCIe, UPI, etc. The message may include a VMID associated with the VM and any other suitable information.

In step 704, the microcontroller subsystem 226 may identify a region assigned to the VM based on the VMID associated with the VM. As discussed with reference to FIG. 5, the memory controller interface 506 may be used to identify the region in the data storage device 202 assigned to the VM based on the VMID. In some instances, the microcontroller subsystem 226 may send a message to the second memory controller 224 to ignore accesses to the data storage device 202 associated with that VMID.

In step 706, the microcontroller subsystem 226 may trigger the TLB engine 222 to re-initialize the translation table 108 for the identified region. For example, the microcontroller subsystem 102 may send a message or an interrupt to the TLB engine 222 using the TLB interface 504.

In step 708, the TLB engine 222 may read, for each page in the identified region, the translation table 108 using the logical address as the index to retrieve the physical address, lock indicator and eviction hint indicators. For example, the TLB engine 222 may use the translation table interface 404 to read the first data portion 108a for each logical address in the identified region. The TLB engine 222 may retrieve the respective physical address, lock indicator and the eviction hint indicator values via the first memory controller 216.

In step 710, the TLB engine 222 may de-assert the lock indicator and the eviction hint indicator, if necessary. If the lock indicator and the eviction hint indicator are set, the TLB engine 222 may de-assert or clear those values for the respective logical addresses. In some implementations, read-modify-write operations may be performed by the TLB manager 408 for the steps 708 and 710. In some other implementations, the step 708 may be optional and instead of performing a read-modify-write operation, the first data portion 108a may be written for each page in the identified region using appropriate write strobes to de-assert or clear the lock indicator and the eviction hint indicator bits by the TLB manager 408.

In step 712, the TLB engine 222 may provide the physical address to the microcontroller subsystem 226. The TLB engine 222 may provide the physical address corresponding to each logical address in the identified region to the microcontroller subsystem 226 via the microcontroller subsystem interface 410.

In step 714, the microcontroller subsystem 226 may de-assert the dirty indicator from the translation table 108 using the physical address as the index. As discussed with reference to FIG. 5, in some implementations, the translation table manager 512 may de-assert the respective dirty indicators in the respective second data portion of the entries using appropriate write strobes using the respective physical addresses as the index. In some other implementations, read-modify-operations may be performed to de-assert the respective dirty indicators.

In step 716, the microcontroller subsystem 226 may send a message to the hypervisor that the VM shutdown has completed. Once the dirty indicators have been cleared for all the physical addresses associated with the identified region, the microcontroller subsystem 226 may use the hypervisor interface 510 to send a message to the hypervisor 210 that the VM shutdown has completed and the VMID can be re-used.

In step 718, the hypervisor 210 may reassign the VMID to another VM as needed.

Embodiments of the disclosed technologies can allow accessing portions of data stored in a contiguous memory region using different indices. A translation table may be configured to store the data in a contiguous memory region so that a first portion of the data can be indexed using a first indexing scheme (e.g., logical address) and a second portion of the data can be indexed using a second indexing scheme (e.g., physical address). The first portion may include information which may be used by one entity and the second portion may include different information which may be used by another entity. For example, the first portion may include a physical address, a lock indicator and an eviction indicator which may be used by the TLB engine for TLB management. The second portion may include a dirty indicator which may be used by the microcontroller subsystem for wear leveling. Thus, storing different information in the same memory region, which may be accessed by different entities using different indexing schemes, may provide a more efficient use of the storage space as compared to storing different information in two different memory regions.

Figure 8:
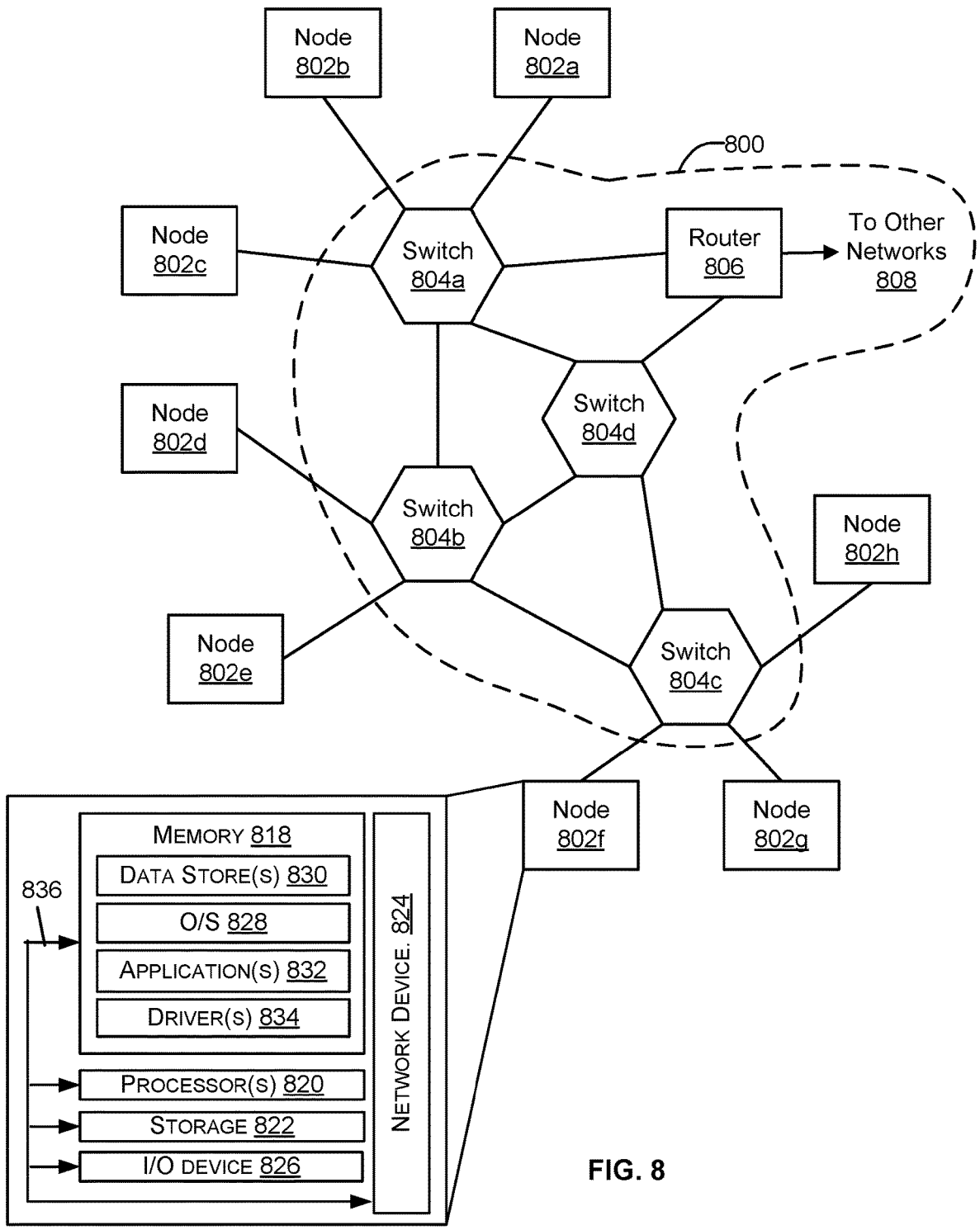
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of devices, such as nodes comprising computer systems. Functionality and/or several components of the apparatus 200 may be used without limitation with the embodiments disclosed with reference to FIG. 8 without limitations. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers. In some embodiments, each of the nodes 802a-802h may include functionality and/or several components of the apparatus 200 without limitation.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device (s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
    a memory configured to store a translation table, the translation table comprising entries, wherein each entry is configured to store data comprising a physical address and information associated with the physical address, wherein the physical address corresponds to a physical memory block in a data storage device; and
    a memory management device communicatively coupled to the memory and to the data storage device, the memory management device configured to:
        receive a request from a host device to write to the data storage device, the request comprising a logical address, wherein the host device is communicatively coupled to the memory management device via an interface;
        retrieve the physical address using the logical address as a first index to the translation table; and
        update the information associated with the physical address using the physical address as a second index to the translation table to access the information associated with the physical address.

2. The apparatus of claim 1, wherein the information associated with the physical address includes a dirty indicator, and wherein updating the information associated with the physical address includes asserting the dirty indicator to indicate that the physical memory block corresponding to the physical address in the data storage device has dirty data.

3. The apparatus of claim 1, wherein the request is initiated by a virtual machine (VM) executing on the host device.

4. The apparatus of claim 1, wherein the physical address is retrieved from a first entry in the translation table and the information associated with the physical address is updated in a second entry in the translation table.

5. The apparatus of claim 1, wherein the memory is a dynamic random access memory (DRAM) and the data storage device is a storage class memory (SCM).

6. An apparatus comprising:
    a memory configured to store in a contiguous region, data that is addressable using a first indexing scheme and a second indexing scheme, each indexing scheme belonging to a different address space, the data comprising multiple portions,
    wherein a first portion of the data is addressable using a first index to a translation table, the first index belonging to the first indexing scheme, and a second portion of the data is addressable using a second index to the translation table, the second index belonging to the second indexing scheme,
    wherein the first index addresses the first portion of the data using a logical address,
    wherein the second index is acquired from a physical address stored in the first portion of the data addressed by the logical address,
    wherein information associated with the physical address is modified using the physical address as the second index to the translation table to access the information associated with the physical address; and
    wherein the first portion of the data is used by a first entity and the second portion of the data is used by a second entity.

7. The apparatus of claim 6 further comprising a memory management device coupled to the memory, the memory management device comprising a translation lookaside buffer (TLB) engine and a microcontroller subsystem, wherein the TLB engine is the first entity and the microcontroller subsystem is the second entity.

8. The apparatus of claim 7, wherein the first portion of the data includes a physical address corresponding to a physical memory block in a data storage device coupled to the memory management device and the second portion of the data includes information associated with the physical address.

9. The apparatus of claim 8, wherein the information associated with the physical address includes a dirty indicator and wherein the microcontroller subsystem is configured to update the dirty indicator to indicate that the physical memory block corresponding to the physical address in the data storage device has dirty data.

10. The apparatus of claim 7, wherein the first index is a logical address belonging to a logical address space, and wherein the logical address is provided by a host device communicatively coupled to the memory management device.

11. The apparatus of claim 7, wherein the second index is a physical address belonging to a physical address space, wherein the physical address corresponds to a physical memory block in a data storage device coupled to the memory management device.

12. The apparatus of claim 11, wherein the TLB engine is configured to provide the physical address to a memory controller coupled to the memory management device to access the physical memory block in the data storage device.

13. The apparatus of claim 7, wherein the first portion of the data comprises a lock indicator to indicate whether an entry is locked into a TLB coupled to the TLB engine.

14. The apparatus of claim 7, wherein the first portion of the data comprises an eviction hint indicator to indicate whether an entry is evictable from a TLB coupled to the TLB engine.

15. The apparatus of claim 6, wherein the contiguous region in the memory comprises an entry in a translation table, wherein the entry is configured to store the first portion of the data and the second portion of the data.

16. The apparatus of claim 6, wherein the contiguous region in the memory comprises multiple entries in a translation table, wherein each entry is configured to store a respective first portion of the data and a respective second portion of the data.

17. A method comprising:
    receiving, by a memory management device, a request to write to a data storage device coupled to the memory management device, the request comprising a logical address from a host device communicatively coupled to the memory management device via an interface;
    retrieving from a memory, by the memory management device, a physical address mapped to the logical address using the logical address as an index to the memory, the memory coupled to the memory management device and configured to store data in a contiguous region, the data comprising the physical address and information associated with the physical address, wherein the physical address corresponds to a physical memory block in the data storage device; and
    updating, by the memory management device, the information associated with the physical address using the physical address retrieved from the memory as the index to the memory to access the information associated with the physical address.

18. The method of claim 17 further comprising:
    sending the physical address to the data storage device to write to the physical memory block corresponding to the physical address.

19. The method of claim 17, wherein the information includes a dirty indicator, and wherein the request is initiated by a virtual machine executing on the host device, the host device further configured to execute a hypervisor, the method further comprising:
    receiving a message from the hypervisor that the virtual machine is shutdown; and
    updating the information using the physical address as the index to the memory to de-assert the dirty indicator.

20. The method of claim 17, wherein updating the information associated with the physical address includes updating only a portion of the data using a write strobe.

* * * * *